US008762009B2

(12) United States Patent
Ehrman et al.

(10) Patent No.: US 8,762,009 B2
(45) Date of Patent: Jun. 24, 2014

(54) IMPACT SENSOR CALIBRATION TOOL

(75) Inventors: Kenneth S. Ehrman, New York, NY (US); Michael L. Ehrman, New York, NY (US); Scott Smail, Bronx, NY (US); Michael Charitonos, Mt. Kisco, NY (US)

(73) Assignee: I.D. Systems, Inc., Woodcliff Lake, NJ (US)

( * ) Notice: Subject to any disclaimer, the term of this patent is extended or adjusted under 35 U.S.C. 154(b) by 794 days.

(21) Appl. No.: 12/949,191

(22) Filed: Nov. 18, 2010

(65) Prior Publication Data

US 2012/0130586 A1 May 24, 2012

(51) Int. Cl.
*G06F 17/18* (2006.01)
(52) U.S. Cl.
USPC .............. 701/47; 180/282; 280/734; 280/735; 701/45
(58) Field of Classification Search
USPC .............. 280/734, 735; 340/436, 438; 701/45, 701/46, 47; 180/282, 283, 284, 285
See application file for complete search history.

(56) References Cited

U.S. PATENT DOCUMENTS

| | | | |
|---|---|---|---|
| 4,665,395 A | | 5/1987 | Van Ness |
| 5,267,147 A | | 11/1993 | Harshaw et al. |
| 5,339,242 A | * | 8/1994 | Reid et al. ................. 701/45 |
| 5,454,074 A | | 9/1995 | Hartel et al. |
| 5,519,260 A | | 5/1996 | Washington |
| 5,608,628 A | * | 3/1997 | Drexler et al. ............. 701/45 |
| 5,660,246 A | | 8/1997 | Kaman |
| 5,686,765 A | | 11/1997 | Washington |
| 5,742,916 A | * | 4/1998 | Bischoff et al. ............. 701/45 |
| 5,812,067 A | | 9/1998 | Bergholz et al. |
| 5,899,948 A | * | 5/1999 | Raphael et al. ............. 701/45 |
| 5,915,973 A | | 6/1999 | Hoehn-Saric et al. |
| 6,057,779 A | | 5/2000 | Bates |
| 6,097,306 A | | 8/2000 | Leon et al. |
| 6,108,591 A | | 8/2000 | Segal et al. |
| 6,122,580 A | | 9/2000 | Autermann |
| 6,301,535 B1 | * | 10/2001 | Nusholtz et al. ............ 701/45 |
| 6,438,472 B1 | * | 8/2002 | Tano et al. ................. 701/29.6 |
| 2004/0133325 A1 | * | 7/2004 | Neal et al. ................. 701/46 |

(Continued)

FOREIGN PATENT DOCUMENTS

WO 0074402 12/2000

OTHER PUBLICATIONS

Deierlein, Bob, "Warehouse Workhorse Goes High-Tech", Beverage World, v119n1688; pp. 98-99, Mar. 15, 2000.
ShockWatch Manual, "ShockMate Programming and Data Retrieval Software for Use with the Shockswitch ID", Global Solutions for Damage Prevention Shockwatch, pp. 1-25.

(Continued)

Primary Examiner — Stephen Holwerda
(74) Attorney, Agent, or Firm — Troutman Sanders LLP; James E. Schutz; Robert R. Elliott, Jr.

(57) ABSTRACT

An impact sensor calibration tool, wherein an impact sensor is installed on a vehicle and in wireless communication with a processor, which analyzes data reported by the impact sensor. Specifically, the impact sensor of the present invention continuously measures two dimensional acceleration of a vehicle. Changes in vehicle acceleration create impulse data and the impact sensor reports this data to a processor. The processor performs statistical calculations on the data to identify the vehicle's normal use operation and from this, develops an impact threshold wherein impulses exceeding this threshold are identified as impacts. The impacts may be further characterized as real impacts and stored in memory for subsequent analysis.

19 Claims, 6 Drawing Sheets

(56) References Cited

U.S. PATENT DOCUMENTS

| | | | |
|---|---|---|---|
| 2005/0131597 A1* | 6/2005 | Raz et al. | 701/29 |
| 2006/0052924 A1* | 3/2006 | Prakah-Asante et al. | 701/45 |
| 2006/0235592 A1* | 10/2006 | Theisen | 701/45 |
| 2008/0255869 A1* | 10/2008 | Young et al. | 705/1 |
| 2008/0319614 A1* | 12/2008 | Kuhn et al. | 701/45 |
| 2009/0177439 A1* | 7/2009 | Samples et al. | 702/179 |

OTHER PUBLICATIONS

Letter and associated documents from opposing counsel dated Apr. 29, 2011.

Barth, Matthew et al., "Intelligent Transportation System Architecture for a Multi-Station Shared Vehicle System", 2000 IEEE Intelligent Transportation Systems, pp. 240-245.

* cited by examiner

IMPACT SENSOR CALIBRATION TOOL

TECHNICAL FIELD

Various embodiments of the present invention relate to impact sensor calibration tools and, more particularly, to an impact sensor calibration tool installed on a vehicle and adapted to operate in various terrains.

BACKGROUND

Impact sensors can be installed on vehicles to monitor impacts the vehicle encounters. Most impact sensors are adapted to set an impact threshold level based on environmental conditions in which the vehicle is most likely to operate. For example, the threshold level for a vehicle that generally operates on a smooth, asphalt-like surface is most likely lower than a threshold level for a vehicle that generally operates on a rough, gravel-like terrain. If the vehicle encounters an impact that exceeds the threshold level, the sensor may then record the impact. This recorded impact can subsequently be analyzed to study the driving habits of a particular vehicle or a particular driver.

Many impact sensors of the prior art require custom tuning of thresholds. Custom tuning of thresholds generally requires exposing the vehicle to a "learning mode" test, wherein data is collected and analyzed. A repeated analysis of the data is often required to set an accurate threshold. This analysis can be done manually, which is expensive and complex, or automatically. Once tuned, the threshold is kept static, regardless of changing environmental conditions, unless a person manually initiates a new learning mode. Therefore, impact sensors installed on vehicles that travel from smooth, asphalt-like terrain to rough, gravel-like terrain create false positive and false negative impact events.

Accordingly, there is a need for an impact sensor that adapts to varying terrain conditions and can be automatically configured without human intervention or any need to collect pre-data, wirelessly or otherwise. There is also a need for an impact sensor that can distinguish between varieties of severity levels. It is to these needs that the present invention is directed.

SUMMARY

The various embodiments of the present invention provide a method of determining vehicle impact events, comprising: sensing vehicle acceleration data, determining vehicle impulse data based on changes in vehicle acceleration, performing statistical calculations on impulse data, setting an impact threshold based on the statistical calculations, identifying vehicle impulse data that exceeds the impact threshold as impacts, characterizing the impact as normal use or a real impact, and recording real impacts for subsequent analysis.

Other embodiments of the present invention provide a method of determining vehicle impact events, comprising: sensing vehicle acceleration data, determining vehicle impulse data based on changes in vehicle acceleration, performing statistical calculations on impulse data, setting an impact threshold based on the statistical calculations, identifying vehicle impulse data that exceeds the impact threshold as impacts, characterizing the impact as normal use or a real impact, calculating an impulse energy level of real impacts, and recording real impacts for subsequent analysis.

Other embodiments of the present invention provide a computer readable medium having program instructions tangibly stored thereon executable by a processor to perform a method for continuously sensing vehicle impact events, comprising: receiving vehicle impulse data from an impact sensor based on changes in vehicle acceleration, performing statistical calculations on impulse data, setting an impact threshold based on the statistical calculations, identifying vehicle impulse data that exceeds the impact threshold as impacts, characterizing the impact as normal use or a real impact, and recording real impacts for subsequent analysis.

DETAILED DESCRIPTION

Figure 1:
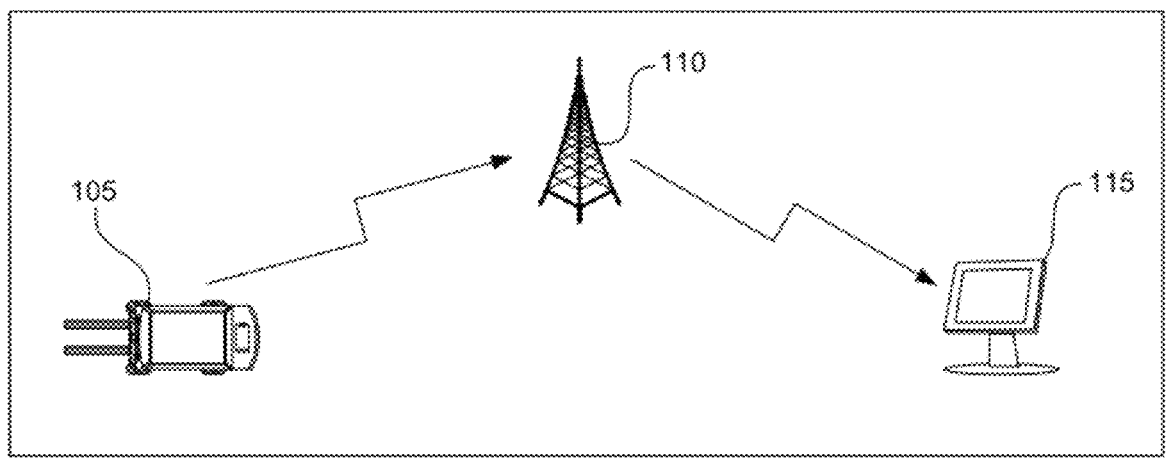
FIG. 1 illustrates an exemplary standard operating environment in which an impact sensor is used.

Exemplary embodiments of the present invention provide for an impact sensor adapted to operate in various dynamic environments, wherein the impact sensor comprises a dynamically adaptive system that allows "normal" use events to be distinguished from "real" impact events.

To facilitate an understanding of the principles and features of the present invention, various exemplary embodiments are explained below for illustrative purposes. In particular, embodiments of the impact sensor are described in the context of using running statistical calculations on impacts to distinguish between normal use and real impact events.

The components and methods described hereinafter as making up various elements and methods of the invention are intended to be illustrative and not restrictive. Other suitable components and methods that would perform the same or similar functions as components described herein are intended to be embraced within the scope of the present invention. Such other components and methods not described herein but potentially embraced by the invention may include, but are not limited to, for example, components developed after development of the invention.

Referring now to the figures, wherein like reference numerals represent like parts throughout the views, various embodiments of the impact sensor and methods providing same will be described in detail.

FIG. 1 illustrates a general operating environment in which the impact sensor of the present invention is used. The impact sensor of the present invention is preferably installed on a vehicle 105. As the vehicle moves, the impact sensor of the present invention continuously measures the change in vehicle acceleration, also referred to as vehicle impulses, and reports this data to a processor. In an exemplary embodiment of the present invention, the impact sensor is in wireless communication 110 with the processor 115. As the processor 115 receives impulse data from the impact sensor, the processor 115 sets an impact threshold, identifies real impacts, and further characterizes real impact data. A detailed explanation of this process is described herein.

Figure 2:
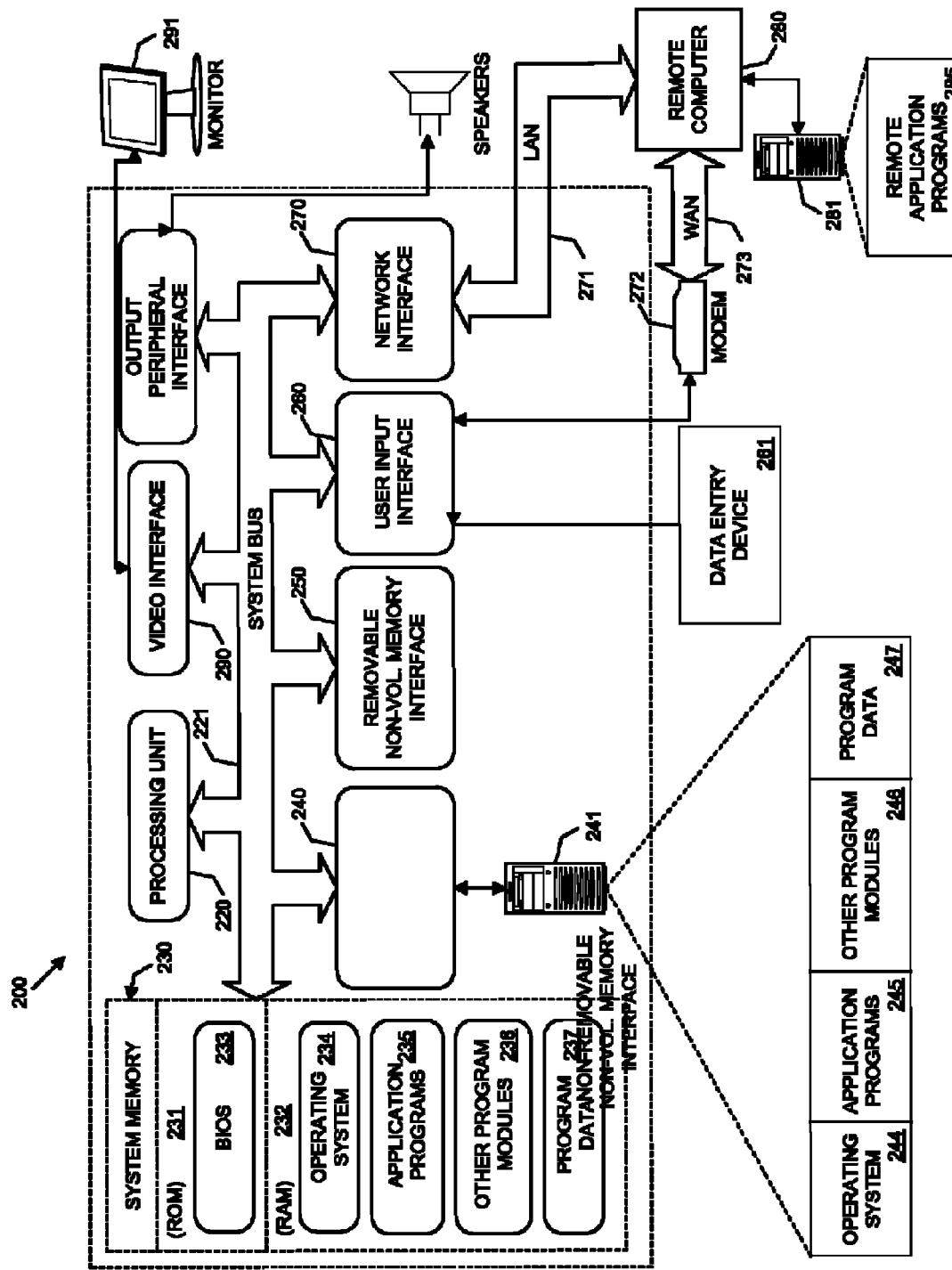
FIG. 2 illustrates an exemplary processing device adapted to analyze and report data from an impact sensor.

FIG. 2 illustrates an exemplary processing device adapted to analyze and report data received by an impact sensor. Although specific components of a processing device 200 are illustrated in FIG. 2, the depiction of these components in lieu of others does not limit the scope of the invention. Rather, various types of processing devices can be used to analyze and report data from an impact sensor. Exemplary embodiments of the present invention can be operational with numerous other general purpose or special purpose processing system environments or configurations. Examples of well known processing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With further reference to FIG. 2, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be any available media that can be accessed by the computing device 200, including both volatile and nonvolatile, removable and non-removable media. For example, and not limitation, computer-readable media can comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 200.

Communication media can typically contain computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable/non-removable, volatile/nonvolatile computer storage media. By way of example only, FIG. 2 illustrates a hard disk drive 241 that can read from or write to non-removable, nonvolatile magnetic media. The hard disk drive 241 can be connected to the system bus 221 through a non-removable memory interface, such as interface 240, or by a removable memory interface, such as interface 250.

The drives and their associated computer storage media discussed above and illustrated in FIG. 2 can provide storage of computer readable instructions, data structures, program modules and other data for the computing device 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client can comprise an application program 235 for requesting and rendering web pages, such as those created in Hypertext Markup Language ("HTML") or other markup languages. The web client can be capable of executing client side objects, as well as scripts through the use of a scripting host. The scripting host executes program code expressed as scripts within the browser environment. Additionally, the web client can execute web application programs 235, which can be embodied in web pages.

A user of the computing device 200 can enter commands and information into the computing device 200 through a data entry device 261. The data entry device 261 may be connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290.

The computing device 200 can operate in a networked environment using logical connections to one or more remote computers, such as a remote computer 280. The remote computer 280 can be a personal computer, a server, a router, a network PC, a peer device, or other common network node, and can include many or all of the elements described above relative to the computing device 200, including a memory storage device 281. The logical connections depicted in FIG. 2 include a local area network (LAN) 271 and a wide area network (WAN) 273, but can also include other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 2 illustrates remote application programs 285 as residing on memory device 281. It will be appreciated that the network connections shown are exemplary and other means of establishing a communications link between the computers can be used.

Figures 3, 4:
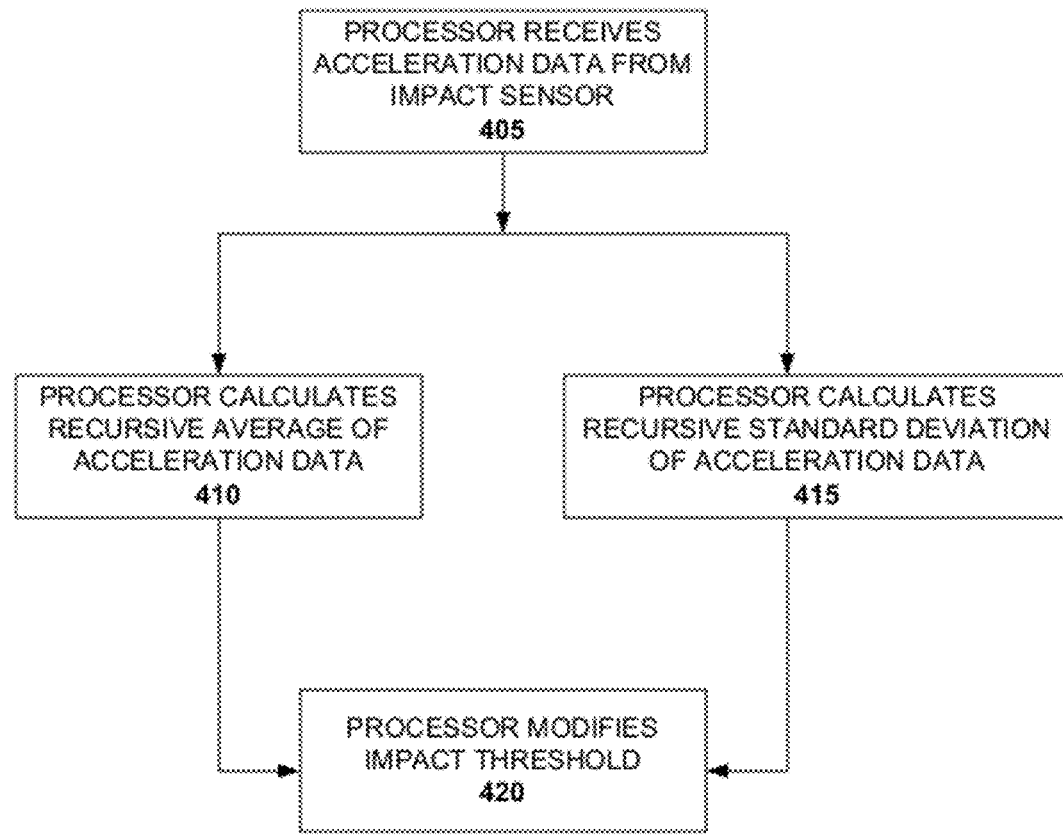
FIG. 3 illustrates an exemplary method of automatically sensing impact events.
FIG. 4 illustrates an exemplary method of performing statistical calculations on acceleration data.

FIG. 3 illustrates an exemplary method of sensing impact events. As described above, the impact sensor of the present invention continuously measures the acceleration of a moving vehicle 305. Vehicle acceleration data aids in identifying vehicle impacts because acceleration monitors the rate in which the vehicle speeds up or slows down. For example, if there is a substantial decrease in vehicle acceleration, this may indicate that the vehicle has encountered an impact that impedes its movement. Contrastingly, if there is a substantial increase in vehicle acceleration, this may indicate that the vehicle was struck from behind. Sharp changes in vehicle acceleration are referred to herein as a vehicle impulse, and while the impact sensor reports all acceleration data to the processor, the vehicle impulses are of primary interest as they are more likely to be considered vehicle impacts.

As the processor receives vehicle acceleration data from the impact sensor 405, the processor calibrates the acceleration data 310 to identify the vehicle's normal use operation 315. To calibrate the acceleration data and identify the vehicle's normal use operation, the processor continuously performs statistical calculations on the data. Specifically, the processor continuously calculates the average acceleration and the standard deviation of the acceleration data, illustrated in FIG. 4. For both the average and standard deviation calculations, more recent calculations are weighted substantially less than historical calculations, thus simulating a recursive average 410 and a recursive standard deviation 415, respectively. Historical calculations are weighted more than recent calculations because historical calculations best determine normal use operation. In exemplary embodiments, more recent calculations are weighted between approximately 3% and 8% and historical calculations are weighted the remainder. For example, recent calculations may be weighted 5% and historical calculations may be weighted 95%. In another example, recent calculations may be weighted 3% and historical calculations may be weighted 97%. In yet another example, recent calculations may be weighted 7% and historical calculations weighted 93%. Calculating a recursive average 410 and a recursive standard deviation 415 enable the impact sensor calibration tool of the present invention to adapt to the various environmental conditions in which a vehicle may operate. To facilitate a relatively fast standard deviation calculation, the processor may utilize a function that approximates standard deviation to avoid the time consuming square root calculation associated with standard deviation calculations. The function returns an integer approximation using relatively few mathematical operations and looping. The processor utilizes the statistical calculations to set and modify the impact threshold 420 based on the vehicle's current operation. Specifically, the processor utilizes the equation, Average+X*Standard Deviation, wherein X can be any factor, to set and modify the impact threshold. Thus, a certain percentage of impacts will be above the threshold calculated from this equation.

Generally, normal use events occur when the acceleration is less than or equal to the sum of the recursive average and the factored standard deviation at any given time. Generally, an impact occurs when the acceleration is greater than the sum of the recursive average and the factored standard deviation at any given time. These impacts are subsequently analyzed to determine if they are real impacts, further discussed herein. If the impact is determined to be a real impact, it is reported to the host for subsequent analysis. A severe impact occurs when the acceleration is substantially greater than the sum of the recursive average and the factored standard deviation at any given time. The ratio defined to be severe may be pre-defined, such as five-times greater. Additionally the ratios can be categorized into numerous severity levels, from low to critical, and can also be adjusted remotely. Severe impacts are reported to the host for subsequent analysis.

Figure 5:
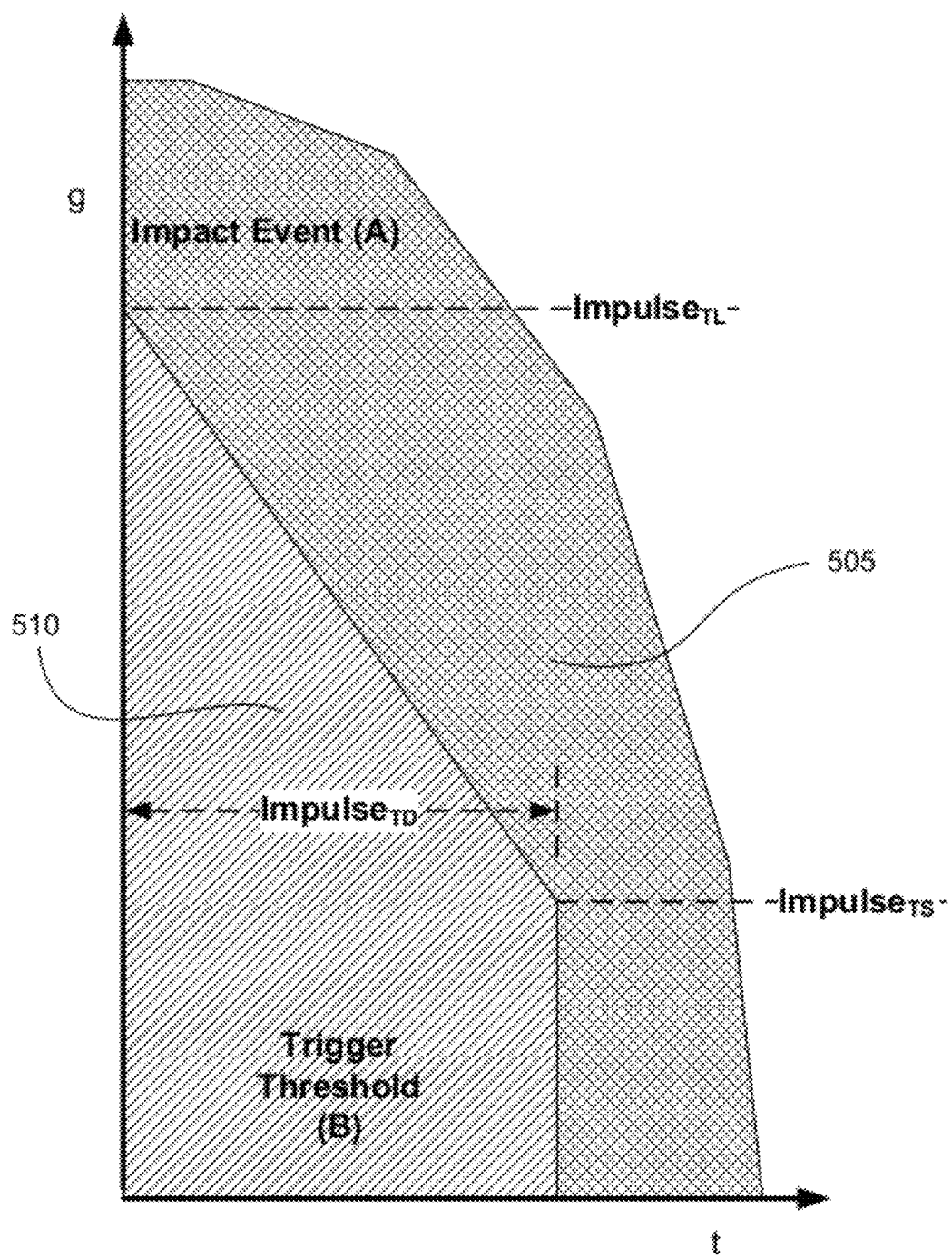
FIG. 5 graphically illustrates parameters that aid in identifying real vehicle impacts, in accordance with exemplary embodiments of the present invention.

FIG. 5 graphically illustrates the parameters that further confirm that a real impact has occurred. Referring specifically to FIG. 5, the area marked 505 represents the energy level of a vehicle impulse. Further, an impact ratio may be calculated as the area of the quadrilateral 505 over the area of quadrilateral 510. Graph 510 represents a theoretical impact at the threshold level, whereby the initial force is the peak, and then linearly reduces until it meets the minimum nominal force within a threshold amount of time. The area of Graph 510 represents the impulse of this threshold level. When comparing this threshold impulse to the actual event impulse, represented by graph 505, one may determine that an impact may have occurred.

Figure 6:
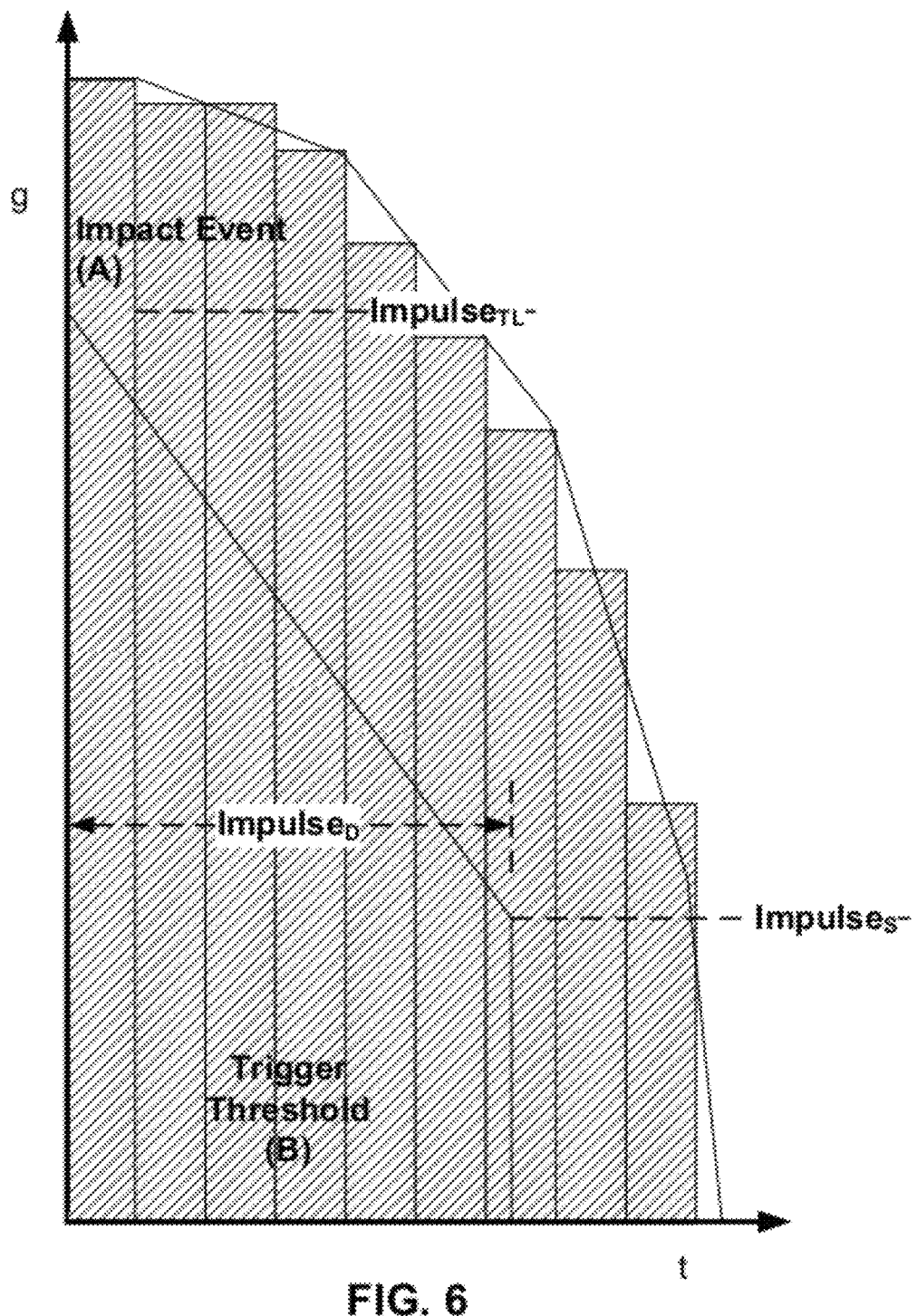
FIG. 6 graphically illustrates an exemplary method of determining impulse energy of an impact.

Once possible impacts have been identified, the processor may subsequently perform additional calculations to further characterize it as a real impact. The processor may first calculate the impulse energy of the real impact. In an exemplary embodiment, the processor performs this calculation by determining the area under the impulse curve that corresponds with the real impact, as illustrated in FIG. 6. It is desirable, however, to use a less resource intensive estimation to calculate the impulse energy of the real impact. Thus, the impulse energy level of real impacts may be estimated by calculating the area of a quadrilateral formed using three points of data, the maximum impulse of the impact ($Impulse_{MAX}$), the duration of the impulse ($Impulse_{ED}$), and the impulse sustain ($Impulse_{TS}$). The maximum impulse of the impact may be calculated for both the minimum and maximum x-coordinate direction and the minimum and maximum y-coordinate direction in which the vehicle travels. The duration associated with the corresponding x-coordinate and y-coordinate values may also be calculated. These parameters are further described in Table 1.

TABLE 1

| Data Point | Description |
| --- | --- |
| $Impulse_{MAX}$ | The maximum of:<br>u8XMaxGImpact; //Impact level in G's X Max Direction<br>u8YMaxGImpact; //Impact level in G's Y Max Direction<br>u8XMinGImpact; //Impact level in G's X Min Direction<br>u8YMinGImpact; //Impact level in G's Y Min Direction<br>i.e. The maximum absolute difference from the zero acceleration point. |
| $Impulse_{ED}$ | The duration associated with the corresponding (x or y) value used for $Impulse_{MAX}$<br>u8XImpactDuration;   //Impact duration in ms<br>u8YImpactDuration;   //Impact duration in ms |

Figure 7:
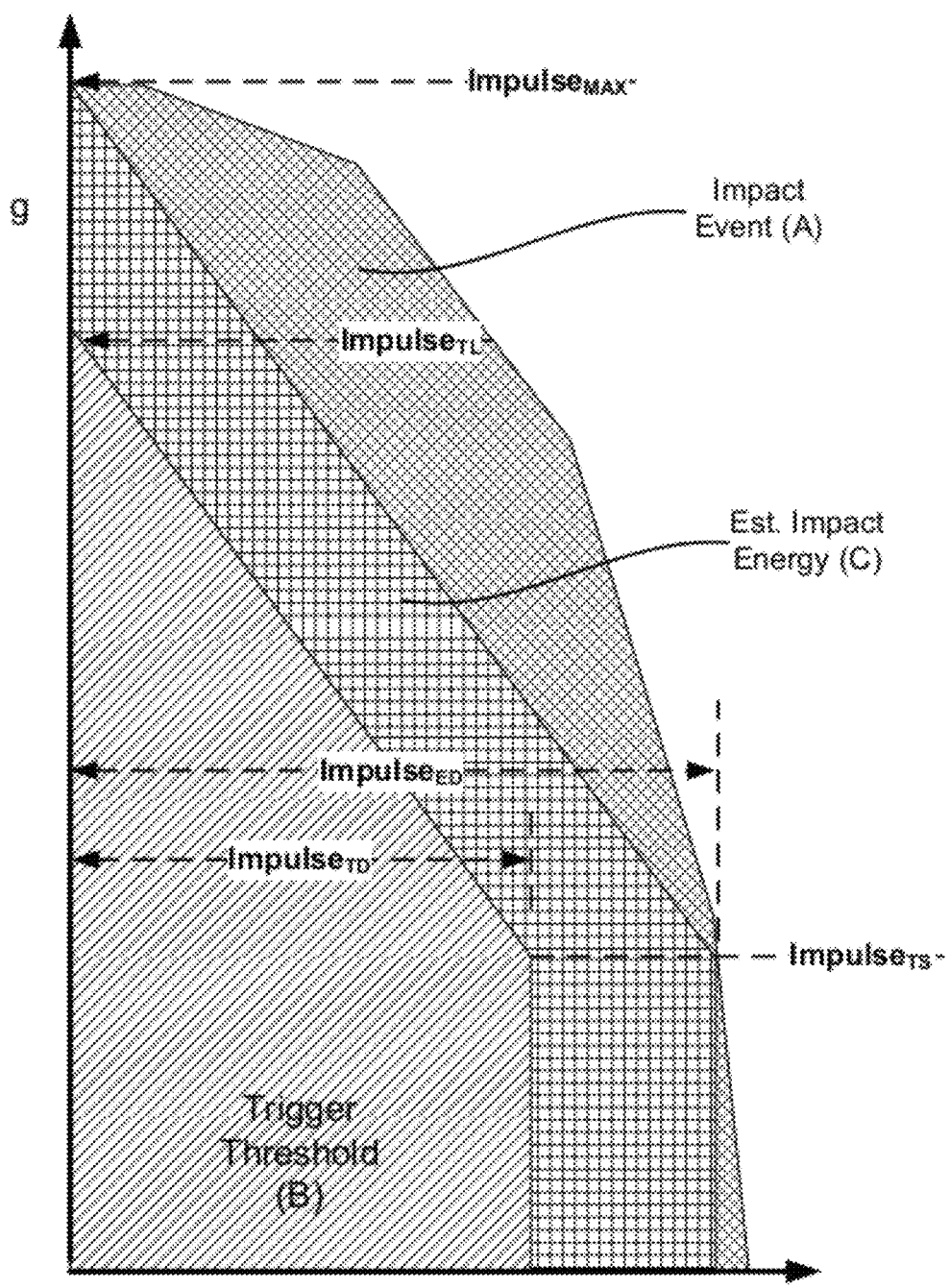
FIG. 7 graphically illustrates an exemplary method of estimating impact energy.

The maximum impulse of the impact, the duration of the impulse, and the impulse sustain data points may be plotted, as illustrated in FIG. 7, to create an estimated impact energy curve. These data points may also be used along with the statistical calculations described above to set and modify the impact threshold. For example, if the duration of the impulse (Impulse$_{ED}$) is greater than 250 ms and the maximum impact is less than 8 g, this situation may imply that the threshold is too low and thus may be increased by one unit. If impacts are occurring too frequently, this may suggest that the threshold is set too low and thus may be increased by two or more units. Similarly, if impacts are occurring too infrequently, this may suggest that the threshold is set too high and thus may be decreased by one or more units. This adjustment process is further described in Table 2.

TABLE 2

| Ref | Status | Description/Action |
|---|---|---|
| Up1 | (Impulse$_{ED}$ > 250 ms) AND (Impulse$_{MAX}$ < 8 g) | This situation implies that Impulse$_{TS}$ is too low. Impulse$_{TS}$ is increased by one unit. |
| Up2 | Impacts occur too frequently. | Compare: (Impulse$_{MAX}$ to Impulse$_{TL}$) and (Impulse$_{ED}$ to Impulse$_{TD}$). Use the "Reference Impact" to set the new thresholds.<br>u8Increment = 0;<br>  If(Impulse$_{MAX}$ > Impulse$_{TL}$)<br>  {<br>    u8Increment = ABS( Impulse$_{TL}$ − Average(Impulse$_{TL}$ , Impulse$_{MAX}$);<br>  }<br>  Impulse$_{TL}$ += MAX(u8Increment, MIN_INC ); And similarly with Impulse$_{ED}$. |
| Dn1 | Impacts occur too infrequently. | Decrease each Impulse$_T$ threshold by one unit. The minimum each thresholds limited to:<br>  2 for Impulse$_{TL}$ (= 0.25642 g)<br>  2 for Impulse$_{ED}$ (= 2 ms)<br>  1 for Impulse$_{TS}$ (= 0.12821 g)<br>  Note normal default levels are 0.5 g, 5 ms, 0.3 g |

In an exemplary embodiment of the present invention, the processor may also calculate an impact trigger level parameter, which may be adjusted to allow a frequency of impact events to be bounded. Several variables may influence the adjustment of the impact trigger level. The first variable is the "average impact period" variable, which is the average amount of time between impacts (also calculated recursively). This variable is reset each time the impact trigger level is adjusted. The second variable is the "time since adjustment" variable, which determines the amount of time since the impact trigger level was last adjusted. The third variable is the "impacts since adjustment" variable, which counts the number of impact events since the threshold was adjusted.

The impact trigger level parameter may also have a post adjustment period that occurs after the impact threshold is adjusted. This period of time can be used to quickly increase the impact threshold, so the processor is not overwhelmed by impact events if the impact trigger level is set too low.

The impact trigger level parameter may also have adjustment thresholds adapted to collectively determine if the impact threshold should be increased. The first adjustment threshold is the "post adjust period duration" threshold, which monitors the number of seconds after the impact threshold is adjusted. The second adjustment threshold is the "post adjust period impacts" threshold, which determines the number of impacts in the post adjust period. The third adjustment threshold is the "perpetual" threshold, which sets a lower threshold for the average amount of time between impacts and is calculated recursively. This threshold is reset each time the impact trigger level is adjusted and evaluated only after the post adjust period.

The impact trigger level threshold may further include adjustment thresholds adapted to collectively determine if the impact threshold should be decreased. The first adjustment threshold is the "time since last impact event" threshold, which sets a threshold for the maximum number of seconds since the last impact reported by the processor. The second adjustment threshold is the "perpetual" threshold, which sets the upper threshold for the average amount of time between impacts and is calculated recursively. This value is also reset each time the impact threshold is adjusted and evaluated only after the post adjust period. Hence, the impact threshold is used by the algorithm to ensure that the sensor settings are effective to distinguish a lower-floor for event data; the impulse threshold is then calculated using data from all events above this lower-floor, and is set based on statistical analysis to separate normal, low-impact events from extraordinary events.

In some embodiments, each impact event may be uploaded to the computing device 200 along with a "confidence level." The confidence level associates how effectively the statistical calculations are operating at the time of the record being created, which may further aid in identifying false alarm impacts. The confidence level calculation is based on a running average count of normal use impacts between each reported impact. For example, if ten normal use impacts occur, followed by a real event, then the numeral ten is added to the running average. In theory, if the number of normal use impacts is low, this may indicate that too many consecutive impacts are being reported and that the environment surrounding the vehicle has changed. Conversely, if the number of normal use impacts is high, this may indicate that real impacts are not being accurately reported to the host.

In other embodiments, vehicle impacts may be categorized by impact direction. For example, the direction can be categorized as either an "X" impact or a "Y" impact to represent a lateral or front-back impact, respectively. In this embodiment, the aforementioned calculations are independently calculated between the two axes. This particular embodiment poses many advantages as lateral impacts are different from front-back impacts. For example, on a forklift, many normal events created impacts in the front/back axis, such as picking up pallets, however, very few normal events occur in the lateral direction. Therefore, it is not desirable to include the pallet picking activities in calculations that raise the threshold for lateral impacts.

In another exemplary embodiment, the impact sensor of the present invention may be installed on construction-type vehicles, for example but not limited to, forklifts, tractors, dump trucks, and bulldozers. However, one skilled in the art will appreciate that the impact sensor may be installed on any type of vehicle, including but not limited to, cars, trucks, airplanes, trains, and motorcycles.

In yet another exemplary embodiment, the impact sensor may comprise a GPS signaling device to further aid in identifying normal use operation from real impact events. For example, if the GPS identifies the vehicle as traveling over railroad tracks, the GPS is adapted to communicate with the processor so the processor can automatically adjust the impact threshold, and report the impact resulting from crossing over the railroad tracks as normal use. Similarly, the GPS device may also have predefined regions for normal use thus enabling the processor to automatically adjust the impact threshold level to reflect such normal use.

Although the present invention is preferably a method for sensing real impact events, similarly designed statistically-adjusted thresholds can be used for other types of sensing. For example, motion sensing, battery sensing, and fuel level sensing may also be achieved using similar methods.

While a method of sensing real impacts has been disclosed in exemplary forms, it will be apparent to those skilled in the art that many modifications, additions, and deletions can be made without departing from the spirit and scope of the present invention, as set forth in the following claims.

What is claimed is:

1. A computer-implemented method of determining vehicle impact events, comprising:
    continuously acquiring, via an impact sensor, vehicle acceleration data;
    continuously receiving, at a computing device, vehicle acceleration data acquired by the impact sensor;
    performing, via the computing device, statistical calculations on the continuously received vehicle acceleration data, wherein the statistical calculations comprise:
        calculating a recursive average of the acceleration data; and
        calculating a recursive standard deviation of the acceleration data,
        wherein the calculated recursive average and recursive standard deviation identify a normal use operation;
    setting, via the computing device, an impact threshold based on the calculated normal use operation;
    determining, via the impact sensor, vehicle impulses based on changes in the acquired vehicle acceleration data;
    identifying, via the computing device, received vehicle impulses that exceed the impact threshold, wherein vehicle impulses exceeding the impact threshold are identified as impacts;
    responsive to identifying impacts, characterizing, via the computing device, each impact as a normal use impact or a real impact;
    responsive to characterizing an impact as a real impact, recording, via the computing device, the real impact for subsequent analysis;
    wherein vehicle impulses less than or substantially equal to a sum of the recursive average and the recursive standard deviation are normal use impacts; and
    wherein vehicle impulses greater than a sum of the recursive average and the recursive standard deviation are real impacts.

2. The method of claim 1, wherein the impact threshold is continuously set based on current vehicle acceleration data and historical vehicle acceleration data.

3. The method of claim 1, wherein sensing vehicle acceleration data comprises sensing two-dimensional vehicle acceleration data.

4. The method of claim 1, wherein calculating the recursive standard deviation comprises utilizing a function that approximates standard deviation, wherein the function returns an integer approximation.

5. The method of claim 1, wherein characterizing each impact as a normal use impact or a real impact comprises:
    identifying a duration of time a vehicle impulse lasts; and
    comparing the duration of the vehicle impulse to a duration of a threshold impulse, wherein the difference between the duration of the vehicle impulse and the duration of the threshold impulse represents a sustain sample.

6. The method of claim 1, further comprising calculating an impulse energy level of a real impact.

7. The method of claim 6, wherein calculating the impulse energy level of a real impact comprises:
    identifying a maximum impulse of the real impact and translating the maximum impulse into a corresponding first point in a quadrant of a Cartesian coordinate plane, wherein the quadrant of the Cartesian plane comprises an origin;
    identifying a duration of the impulse of the real impact and translating the duration of the impulse into a corresponding second point in the quadrant of the Cartesian coordinate plane;
    identifying a sustain of the impulse of the real impact and translating the sustain of the impulse into a corresponding third point in the quadrant of the Cartesian coordinate plane; and
    calculating the area of the quadrilateral formed using the first point, the second point, the third point, and the origin of the Cartesian plane.

8. The method of claim 1, further comprising:
    tracking a vehicle using a global positioning system, wherein the global positioning system is adapted to assist with setting the impact threshold.

9. The method of claim 1, further comprising:
    uploading the impacts with a confidence level, wherein the confidence level provides an indication of how effectively the statistical calculations are working.

10. The method of claim 1, further comprising categorizing the impacts by impact direction.

11. A computer-implemented method of determining vehicle impact events, comprising:
    continuously acquiring, via an impact sensor, vehicle acceleration data;
    continuously receiving, at a computing device, vehicle acceleration data acquired by the impact sensor;
    performing, via the computing device, statistical calculations on the continuously received vehicle acceleration data, wherein the statistical calculations comprise:
        calculating a recursive average of the acceleration data; and
        calculating a factored recursive standard deviation of the acceleration data,
        wherein the calculated recursive average and factored recursive standard deviation identify a normal use operation;
    setting, via the computing device, an impact threshold based on the calculated normal use operation;
    determining, via the impact sensor, vehicle impulses based on changes in the acquired vehicle acceleration data;
    identifying, via the computing device, received vehicle impulses that exceed the impact threshold, wherein vehicle impulses exceeding the impact threshold are identified as impacts;
    responsive to identifying impacts, characterizing, via the computing device, each impact as a normal use impact or a real impact;
    responsive to characterizing an impact as a real impact, calculating, via the computing device, an impulse energy level of the real impact;
    further responsive to characterizing an impact as a real impact, recording, via the computing device, the real impact for subsequent analysis;
    wherein vehicle impulses less than or substantially equal to a sum of the recursive average and the factored recursive standard deviation are normal use impacts; and
    wherein vehicle impulses greater than a sum of the recursive average and the factored recursive standard deviation are real impacts.

12. A non-transitory computer readable medium having program instructions tangibly stored thereon executable by a processor to perform a method for continuously sensing vehicle impact events, comprising:

continuously receiving vehicle acceleration data from an impact sensor, wherein the impact sensor acquires vehicle acceleration data based on changes in vehicle acceleration;

performing statistical calculations on the continuously received vehicle acceleration data, wherein the statistical calculations comprise:

calculating a recursive average of the acceleration data; and calculating a recursive standard deviation of the acceleration data, wherein the calculated recursive average and recursive standard deviation identify a normal use operation;

setting an impact threshold based on the calculated normal use operation;

receiving vehicle impulses from the impact sensor, wherein the impact sensor determines vehicle impulses based on changes in the acquired vehicle acceleration data;

identifying received vehicle impulses that exceed the impact threshold, wherein vehicle impulses exceeding the impact threshold are identified as impacts;

responsive to identifying impacts, characterizing each impact as normal use impact or real impact;

responsive to characterizing an impact as a real impact, recording the real impact for subsequent analysis;

wherein vehicle impulses less than or substantially equal to a sum of the recursive average and the recursive standard deviation are normal use impacts; and wherein vehicle impulses greater than a sum of the recursive average and the recursive standard deviation are real impacts.

13. The computer readable medium of claim 12, wherein the impact threshold is continuously set based on current vehicle acceleration data and historical vehicle acceleration data.

14. The computer readable medium of claim 12, wherein calculating the recursive standard deviation comprises utilizing a function that approximates standard deviation, wherein the function returns an integer approximation.

15. The computer readable medium of claim 12, wherein characterizing each impact as normal use impact or a real impact comprises:

identifying a duration of time a vehicle impulse lasts; and comparing the duration of the vehicle impulse to a duration of a threshold impulse, wherein the difference between the duration of the vehicle impulse and the duration of the threshold impulse represents a sustain sample.

16. The method of claim 12, further comprising calculating an impulse energy level of a real impact.

17. The method of claim 11, wherein the recursive average and the factored recursive standard deviation are calculated separately on the x-axis, the y-axis, and the z-axis.

18. The method of claim 11, wherein the factored recursive standard is calculated for a single vehicle.

19. The method of claim 11, wherein the factored recursive standard is calculated for a plurality of vehicles.

* * * * *